Patented May 15, 1945

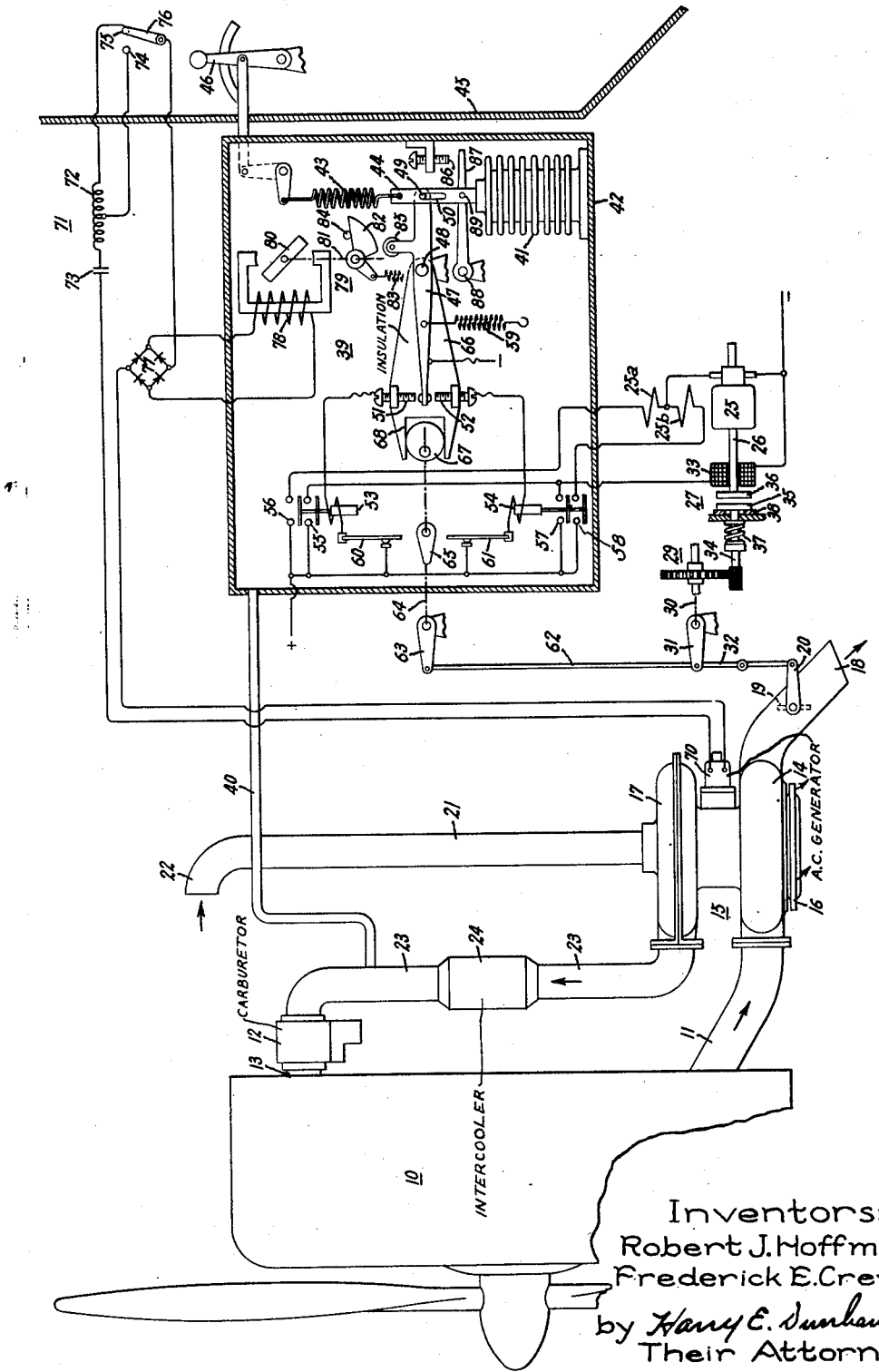

2,376,142

UNITED STATES PATENT OFFICE 2,376,142

CONTROL SYSTEM FOR AIRCRAFT TURBOSUPERCHARGERS

Robert J. Hoffman, Schenectady, and Frederick E. Crever, Scotia, N. Y., assignors to General Electric Company, a corporation of New York Application April 1, 1943, Serial No. 481,444

14 Claims. (Cl. 230—114)

Our invention relates to a control system for aircraft turbosuperchargers, and especially to control systems for turbosuperchargers wherein the turbosupercharger is operated by exhaust gases from an aircraft internal combustion engine and the air compressed by the turbosuperchargers is used to supercharge the engine. Specifically, our invention is an improvement on the control system disclosed and claimed in the application of David R. Shoults, Serial No. 452,-294, filed July 25, 1942, and assigned to the same assignee as the present application.

An object of our invention is to provide a new and improved control system for tourbosuperchargers for aircraft.

Another object of our invention is to provide regulating means for turbosuperchargers which maintain constant a predetermined pressure appurtenant to the operation of the supercharger, such, for example, as intake manifold pressure or carburetor intake pressure, and, furthermore, to maintain this pressure over a predetermined range of operation with great stabilty.

Still another object of our invention is to provide new and improved means for regulating a turbosupercharger in which constant carburetor inlet pressure is maintained over a predetermined range of operation, and thereafter substantially constant turbosupercharger speed is maintained.

Further objects and advantages of our invention will become apparent as the following description proceeds, and the features of novelty which characterize our invention will be pointed out with particularity in the claims annexed to and forming a part of this specification.

For a better understanding of our invention, reference may be had to the accompanying drawing in which the single figure thereof is a diagrammatic view of a turbosupercharger control system embodying our invention.

Referring now to the drawing, 10 indicates an aircraft internal combustion engine having an intake manifold, not shown, and an exhaust manifold, only a portion of which is shown at 11. A carburetor 12 is schematically indicated as having its outlet connected to the intake manifold, not shown, as by means of a conduit 13. Exhaust manifold 11 is connected either directly or through a suitable conduit to the nozzle box 14 of an exhaust gas-driven supercharger generally indicated at 15. The turbine wheel of the supercharger 15 is indicated at 16 and the compressor at 17. Connected with the nozzle box 14 is a waste gate conduit 18 in which is located an adjustable valve means or waste gate 19 used in regulating the turbosupercharger. On the shaft of waste gate or valve 19 is fixed an arm 20 for use in positioning the valve.

Connected to the inlet of compressor 17 is an intake conduit 21 for conveying air from the slip stream of the aircraft to the compressor. To this end conduit 21 is connected with a suitable ram 22 which faces into the slip stream of the aircraft. The discharge side of compressor 17 is connected by a conduit 23 to the intake of carburetor 12. If desired, a suitable intercooler, such as is indicated at 24, may be provided in conduit 23 to maintain the temperature of the air entering carburetor 12 within a predetermined range for best airplane performance.

The arrangement so far described is a known one and is to be taken as typical of any turbosupercharger installation. In operation, exhaust gases from the aircraft engine are supplied through exhaust manifold 11 and a suitable conduit, if this is necessary, to the nozzle box 14 from which they are discharged through a ring of nozzles to the turbine wheel 16 of turbosupercharger 15 or, through waste conduit 18 directly to the atmosphere. When waste gate 19 is wide open, substantially all the exhaust gases discharge directly to atmosphere, little if any passing through the nozzles to the turbine wheel 16. This represents no load on the suppercharger. As waste gate 19 is gradually closed, pressure is built up in nozzle box 14 effecting a gradually increasing flow of exhaust gases through the nozzles to the turbine wheel to operate the supercharger. Maximum load on the supercharger is reached when waste gate 19 is fully closed so that all gases from the engine are discharged against the turbine wheel 16. Ordinarily waste gate 19 is in an intermediate position, part of the exhaust gases being discharged to atmosphere and the remainder passing through the turbine wheel 16.

Our invention has to do particularly with an improved means for regulating waste gate 19.

The position of waste gate 19 may be varied by any suitable means, such for example as a hydraulic piston or the like. However, due to the very low temperatures encountered by high flying aircraft the oil used to operate a piston or similar means is likely to congeal and unsatisfactory operation result. Preferably, therefore, we control the position of waste gate 19 through operation of means comprising an electric motor 25 of the split series field type having field windings 25a and 25b. Upon proper energization of motor 25, it will, as desired, rotate in either direction. The shaft 26 of motor 25 is connected through a suitable clutch brake or magnetic coupling generally indicated at 27, gearing 29, shaft 30, crank 31 and linkage 32 to arm 20 controlling the position of waste gate valve 19. The clutch brake 27 comprises an electrical winding 33 which, when energized, produces a magnetic flux causing longitudinal movement of a shaft 34 and a magnetic member 35 so as to engage with a cooperating magnetic member 36 on shaft 26 whereupon motor 25 drives gearing 29 and consequently also positions waste gate 19. Upon deenergization of winding 33 a suitable spring means 37 causes shaft 34 to move away from shaft 26 and, furthermore, causes member 35 to engage against a stationary braking member 38, thereby quickly stopping waste gate 19 in the desired position and permitting motor 25 to continue to rotate until its kinetic energy is dissipated. The positioning of waste gate 19 is thereby accurately controlled since the brake portion of clutch brake 27 operates immediately upon deenergization of winding 33.

The operation of motor 25 and, consequently, the position of waste gate valve 19 may be controlled, as will be obvious from the following description, in response to any pressure appurtenant to an operating condition of the supercharger 15, such for example as carburetor inlet pressure or supercharger discharge pressure. It has been found desirable to maintain this pressure constant for normal operation of the aircraft. This means that as the aircraft rises the speed of the supercharger must increase to maintain this pressure constant. When a predetermined critical speed is reached it is not feasible to permit further increase in speed of the supercharger to maintain constant the pressure being regulated. Furthermore, it has been found desirable to regulate the speed of the supercharger and maintain it constant at the critical speed for altitudes above the so-called "critical altitude" which is the altitude at which the maximum desirable supercharger speed to maintain constant a predetermined pressure is attained. In order to operate motor 25 and solenoid-operated clutch brake 27 so as to properly position waste gate 19 to maintain constant a predetermined pressure appurtenant to an operating condition of the aircraft engine 10 or supercharger 15 up to a certain critical speed and thereafter to maintain constant this critical speed we provide a regulating means generally indicated at 39. Although it should be understood that the pressure to be regulated may be any pressure appurtenant to the operation of supercharger 15 we have chosen by way of example to illustrate our invention as regulating compressor discharge or carburetor inlet pressure. Accordingly the carburetor inlet pressure in conduit 23 is connected by means of a conduit 40 with the pressure responsive means illustrated as a flexible bellows 41 of regulating means 39.

It has been found that at high altitudes in the rarefied atmosphere found there, relays, switching devices and the like may not operate satisfactorily due to severe arcing and the like, which arcing would not occur at atmospheric pressures. To eliminate any undesirable arcing of the relays and switching devices of regulating means 39 we have provided a sealed box or housing 42 within which is mounted substantially all of regulating means 39. Conduit 40 is connected to sealed box 42 as indicated so that the pressure in box 42 is carburetor inlet or compressor discharge pressure. The exterior of bellows 41, which is fastened to one of the walls of box 42 is subjected to this pressure and the interior of bellows 41 is evacuated so that movement of bellows 41 will be in response to absolute carburetor inlet or compressor discharge pressure. With this arrangement only a single bellows is required to regulate a predetermined absolute pressure appurtenant to an operating condition of supercharger 15.

The movement of evacuated bellows 41 is opposed by a tension spring, generally indicated at 43, which is connected to bellows 41 through a connecting link 44. The tension of spring 43 and consequently the pressure to be regulated may be controlled manually from the aircraft cabin 45 by means of a manual control rod 46 which is connected to spring 43 by means entering the sealed box 42 through a suitable stuffing box or the like, not shown. Any change in the pressure within box 42 will cause the bellows 41 to expand or contract and move a contact-controlling arm 47 pivotally mounted at 48 and connected to link 44 by means of a pin and slot connection generally indicated at 49 and 50, respectively. This pin and slot connection, as will become apparent from the following description, provides the mechanical take-over means for the overspeed control which functions when the aircraft operates above the critical altitude. For conditions of equilibrium the tension of spring 43 must be equal to the area of bellows 41 multiplied by the pressure in sealed box 42. This pressure is, as was mentioned above, the quantity to be regulated which has been illustrated by way of example as the carburetor inlet or the compressor discharge pressure. If the pressure in sealed box 42 increases, the force on the bellows area is greater than the tension of spring 43 so that the bellows 41 is compressed. If, on the other hand, the pressure in sealed box 42 decreases, the force on the bellows area is less than the spring tension so that the bellows is extended. This motion of bellows 41 is made to control waste gate 19 to correct for pressure changes through the operation of contact-controlling arm 47.

Contact-controlling arm 47 is arranged to engage contacts 51 or 52 so as to energize relays 53 or 54, respectively. Contacts 51 and 52 are adjustable as clearly shown in the drawing. The relay 53 is provided with two sets of normally open contacts 55 and 56 while the relay 54 is provided with two sets of normally open contacts 57 and 58. The contacts 55 and 57 when closed control the energization of the winding 33 of clutch brake 27. Contacts 56, on the other hand, of relay 53 control the energization of field winding 25a, as well as the armature of motor 25 and contacts 58 of relay 54 control the energization of field winding 25b as well as the armature of split field direct current motor 25. It will be obvious therefore that when contact-controlling member 47 engages contact 51, relay 53 is energized to close contacts 55 and 56 so as to energize winding 33 of clutch brake 27 and winding 25a of motor 25. This particular energization will tend to rotate shaft 26 of motor 25 so as to open waste gate 19, thereby decreasing the speed of turbo-supercharger 15 and consequently decreasing the pressure in sealed box 42. Contact 51 is therefore the waste gate opening contact. Similarly, if contact-controlling arm 47 engages waste gate closing contact 52, relay 54 is energized to energize winding 33 of clutch brake 27 and field winding 25b of motor 25 so that waste gate 19 may be moved to tend to further close waste conduit 18.

In order that bellows 41 may control the movement of contact-controlling arm 47 over a range of operation during which time it is desired to maintain constant the carburetor inlet pressure, we provide a spring 59 which during this range maintains the pin 49, which is illustrated as being fastened to contact-controlling arm 47, in engagement with the upper end of slot 50, which slot is illustrated as being formed in link 44.

In order to prevent overtravel of the waste gate 19, we provide suitable limit switches which are connected in series with the windings of relays 53 and 54. To prevent undesirable arcing at high altitudes, we have disclosed limit switches 60 and 61 as mounted within sealed box 42 which is pressurized as was mentioned above. Limit switch 60 is connected in series with the winding of relay 53 while limit switch 61 is connected in series with the winding of relay 54. These limit switches are actuated by means of a link 62 interconnecting crank 31 and a crank 63 suitably mounted on a rotatable shaft 64. A member 65 rotatable with shaft 64 engages either of limit switches 60 or 61 in the extreme positions of waste gate 19, thereby preventing overtravel and controlling, furthermore, the total waste gate travel.

To stabilize the operation of regulating means 39 we provide an anti-hunting means in the form of a follow-up system which includes pivotally mounted insulating arm 66 from which contacts 51 and 52 are supported. As illustrated in the drawing, member 66 is pivotally mounted at 48, from which contact-controlling arm or regulating member 47 is also pivotally mounted. It should be understood, however, that contact-controlling arm 47 and member 66 may be pivotally supported from separate pivots if desired. Pivotally mounted member 66 supporting contacts 51 and 52 is moved in response to waste gate valve position by any suitable means such as a crank or the like. As illustrated in the drawing, this means comprises a disk 67 eccentrically mounted on shaft 64 and rotatable within a notch 68 formed in insulating member 66. It will be obvious that with this arrangement a follow-up mechanism is provided which is operated in response to waste gate position. The movement of the contacts 51 and 52 for full movement of the waste gate 19 determines the amount of droop in the regulator, while the distance between contacts 51 and 52 determines the sensitivity of the regulator. Sensitivity is the pressure difference required to move contact-controlling arm 47 from one contact, such as 51, to the other contact, such as 52, or vice versa, while droop is the recalibration of regulated pressure caused by movement of the waste gate 19 from the fully open to the fully closed position. It will be observed that this anti-hunting or follow-up mechanism causes a permanent recalibration of pressure with altitude, the magnitude of which depends upon the waste gate motion and the total amount of droop required for stability.

As was mentioned above, after the aircraft attains the critical altitude which may be in the neighborhood of 25,000 feet, the speed of the supercharger 15 has increased to a value above which it is not feasible to operate it for any long periods of time, and consequently it is desirable to provide means for preventing this speed from exceeding the so-called critical speed. At altitudes above that corresponding to the critical speed of the supercharger, therefore, we provide regulating means to hold this critical speed constant. In order to obtain a quantity proportional to the speed of the supercharger, we have provided an alternating current generator indicated at 70 which may be driven directly from the supercharger 15. The output of this generator is preferably fed to a load circuit to be described hereinafter through a tuned circuit generally indicated at 71, comprising an inductance 72 and a capacitor 73 serially arranged with respect to one another. The purpose of this tuned circuit is to make the overspeed control more sensitive when the supercharger 15 is operating near critical speed, consequently, by arranging the values of the inductance 72 and the capacitance 73 so that they provide a resonant circuit at the frequency of generator 70 when operating at the critical speed of supercharger 15. With this arrangement, at critical speed the capacitance and inductance neutralize one another and output current of generator 70 is limited only by the resistance of the circuit.

It will be understood that under certain conditions of operation of the aircraft with which our supercharger control mechanism is associated, it might become necessary to operate the supercharger 15 at a higher speed than that permitted by the overspeed control to be described hereinafter, and to this end we have provided a pair of taps 74 and 75 on inductance 72 with a switching means 76 to control whether all of inductance 72 or only a portion thereof is connected in the circuit. When switch 76 is in the position indicated in the drawing, the overspeed mechanism is arranged to maintain a constant supercharger speed at altitudes above the critical speed of the supercharger. When switch 76 is moved to engage contact or tap 74, a greater speed may be attained by supercharger 15. This increase may be 10 per cent or more and should be used only for very short periods of time if damage to the supercharger is to be prevented.

It will be obvious from the above description that the resonant circuit 71 could be modified so that switching means 76 causes a variation of the capacitance instead of changing the inductance. This latter scheme may have an advantage in that inductance 72 may be dispensed with and the inductance of the winding of generator 70 and the rest of the associated circuit may serve as the inductance which is neutralized by the capacitance at the frequency of generator 70 corresponding to the critical speed of supercharger 15.

The output of generator 70 which passes through resonant circuit 71 is impressed across the terminals of a full wave rectifier generally indicated at 77 so that a direct current is impressed across the winding 78 of a torque motor generally indicated at 79. Torque motor 79 comprises an armature 80 which is connected by means of a shaft 81 to a cam 82. Rotor 80 and cam 82 are biased in a counterclockwise direction as viewed in the drawing by spring means 83, and counterclockwise rotation is limited by a suitable stop 84. When a current of sufficient magnitude energizes winding 78, armature 80 of torque motor 79 is rotated in a clockwise direction against the tension of spring means 83. Such clockwise rotation of armature 80 of torque motor 79 will cause cam 82 to engage a roller 85 mounted on contact-controlling arm 47, whereupon the torque motor 79 takes control of regulating member 47 away from bellows 41 and spring means 43. The pin and slot connection comprising members 49 and 50, respectively, provide the mechanical take-over means by which torque motor 79 may control contact-controlling arm 47, which control is relinquished by bellows 41.

The expansion of bellows 41 is limited by a suitable stop 86 mounted in sealed box 42 which engages with a suitable stop member 87 pivotally mounted at 88 and connected to link 44 as indicated at 89. When cam 82 engages roller 85, pin 49 moves downwardly in slot 50 so that contact-controlling arm 47 is free to move in response to operation of torque motor 79.

It will be obvious that the follow-up mechanism used for stability operation and described in connection with the pressure-regulating means above operates in exactly the same manner on overspeed control as it does on pressure regulation. It requires that the torque motor 79 holds a slightly different speed with the waste gate wide open than it does with the waste gate closed. This causes no difficulty since the waste gate moves through a very small angle when holding constant the speed of the supercharger 15 above the critical altitude.

The operation of the turbosupercharger regulator described will be fairly obvious from the detailed description included above. Assume that the aircraft is in the air and is flying at an altitude lower than the critical altitude of the supercharger, that is, at an altitude below the maximum for which the supercharger is capable of maintaining, without excess speed, a predetermined pressure at the discharge side of the compressor, for example, sea level pressure. Assume also that at such altitude waste gate 19 is in a partially closed position, as indicated in the drawing, and the supercharger is operating at a speed such that the desired pressure obtains on the discharge side of compressor 17 of the supercharger 15. With this arrangement contact-controlling arm 47 will be controlled in response to the absolute discharge pressure through operation of bellows 41. If now the pressure on the discharge side of compressor 17 decreases, the pressure within sealed box 42 will decrease and bellows 41 will expand so that spring 59 will cause the left-hand end of regulating member 47 to move downwardly to engage waste gate closing contact 52 with the consequent energization of relay 54, field winding 25b and the armature of split field motor 25 as well as energization of winding 33 of clutch brake 27. Such energization of motor 25 will cause waste gate 19 to be moved toward the closed position, thereby causing more of the exhaust gases from aircraft engine 10 to pass through the nozzles of turbine wheel 16 with consequent increase in speed of supercharger 15. Such increase in speed will tend to increase the discharge pressure of compressor 17. Movement of waste gate 19 to the closed position will also rotate disk 67 eccentrically mounted on shaft 64 in a direction to cause contact 52 to move away from regulating member 47 so that if the increase in pressure called for was small, the contact between regulating member 47 and contact 52 would be broken, stopping motor 25 and particularly shaft 34 before waste gate 19 has been closed too far. If a large increase in pressure had been called for, the contact-controlling arm or regulating member 47 would follow the contact 52 until the waste gate 19 was completely closed, thus accelerating the supercharger 15 and increasing the pressure at the maximum rate possible. As soon as the supercharger picks up speed and the pressure in sealed box 42 approaches the pressure called for by the setting of spring 43, the regulating member 47 is moved to engage contact 51 which tends to cause opening of waste gate 19. By properly adjusting the regulator, the pressure in sealed box 42 will increase rapidly at first and then slow down just before it reaches the value called for, stopping at this value with no overshooting or undershooting.

When the critical altitude is reached, that is the altitude at which maximum desired speed of supercharger 15 is attained, the output of generator 70 by virtue of resonant circuit 71 suddenly increases rapidly so that torque motor 79 becomes effective to move cam 82 against the tension of spring 83, causing regulating member 47 to engage contact 51 with the consequent opening of waste gate 19 thereby reducing the speed of supercharger 15. If the speed of supercharger 15 is reduced too far, the torque motor 79 is rotated by spring means 83 so that regulating member 47 may engage contact 52 with the consequent closing of waste gate valve 19 and increase in speed of supercharger 15. Above the critical altitude of the aircraft, therefore, torque motor 79 opens and closes the waste gate valve in order to hold the critical speed of supercharger 15 constant.

With the invention described above it is possible to obtain close automatic and stable regulation of the turbo-supercharger with improved apparatus which is very simple in construction and reliable in operation.

While we have shown and described a particular embodiment of our invention, it will be apparent to those skilled in the art that our invention is not limited to the particular embodiment shown, but that changes and modifications may be made without departing from the spirit and scope of our invention, and we aim in the appended claims to cover all such changes and modifications.

What we claim as new and desire to secure by Letters Patent of the United States is:

1. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation, electrical means for taking control of said supercharger away from said last mentioned means outside said range of operation to maintain the speed of said supercharger below a predetermined value comprising an alternating current generator driven by said supercharger, a torque motor energized from said generator, and a circuit including a combination of inductance and capacitance connected between said torque motor and said generator for preventing effective energization of said torque motor when the speed of said supercharger is below said predetermined value.

2. In combination, a turbosupercharger, valve means for regulating the flow of exhaust gases from the engine to the turbine, means responsive to a predetermined pressure appurtenant to an operating condition of said supercharger for positioning said valve means to maintain said predetermined pressure at a substantially constant value over a predetermined range of operation including a plurality of relays and limit switches, a housing containing said last mentioned means including said relays and limit switches, means for maintaining the interior of said housing at a pressure corresponding to said predetermined pressure to preclude the rarefied atmosphere at high altitudes from adversely affecting said relays and limit switches, and means including a generator driven from the supercharger for counteracting the first mentioned means near the critical speed of the supercharger.

3. In combination, a turbo-supercharger, valve means for regulating the flow of exhaust gases to the turbine, means responsive to the supercharger discharge pressure for positioning said valve means to maintain said pressure at a substantially constant value over a predetermined range of operation including a plurality of relays and limit switches, a housing containing said last mentioned means including said relays and limit switches, means for maintaining the interior of said housing at a pressure corresponding to said discharge pressure to preclude the rarefied atmosphere at high altitudes from adversely affecting said relays and limit switches, and means including an electric generator driven from the supercharger and a device energized from the generator to maintain substantially constant supercharger speed beyond said operating range.

4. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation including electrical switching means, a housing containing said last mentioned means including said switching means, means for maintaining the interior of said housing at a pressure corresponding to said predetermined pressure to preclude the rarefied atmosphere at high altitudes from adversely affecting said switching means, and means including an electric generator driven from the supercharger and a torque motor connected to the generator and arranged to counteract said first mentioned means upon considerable pressure changes.

5. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation including a contact controlling member, a housing containing said last mentioned means including said contact controlling member, means for maintaining the interior of said housing at a pressure corresponding to said predetermined pressure to preclude the rarefied atmosphere at high altitudes from adversely affecting the operation of said contact controlling member, and electric means responsive to the changes of the supercharger speed beyond said range of operation for positioning said contact controlling member.

6. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation, electrical means for taking control of said supercharger away from said last mentioned means outside said range of operation to maintain the speed of said supercharger below a predetermined value comprising an alternating current generator driven by said supercharger, a torque motor energized from said generator, and means for preventing effective energization of said torque motor when the speed of said supercharger is below said predetermined value.

7. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation, electrical means for taking control of said supercharger away from said last mentioned means outside said range of operation to maintain the speed of said supercharger below a predetermined value comprising an alternating current generator driven by said supercharger, a torque motor energized from said generator and means including a circuit substantially resonant at a frequency corresponding to the maximum desired speed of said supercharger for preventing effective energization of said torque motor when the speed of said supercharger is below said predetermined value.

8. In combination, a turbosupercharger, a waste gate for regulating the flow of exhaust gases to the turbine, a motor for positioning said waste gate, means responsive to a predetermined pressure appurtenant to an operating condition of said supercharger for controlling said motor to position said waste gate and maintain said predetermined pressure at a substantially constant value over a predetermined range of operation, including a pivotally mounted contact controlling member and a flexible bellows responsive to said predetermined pressure connected to said contact controlling member, a waste gate opening contact adapted to be engaged by said contact controlling member to energize said motor to open said waste gate upon an increase in pressure above said predetermined pressure, a waste gate closing contact adapted to be engaged by said contact controlling member to energize said motor to close said waste gate upon a decrease in pressure below said predetermined pressure, means for taking control of said supercharger away from said first mentioned means outside said range of operation to prevent said supercharger from exceeding a predetermined speed comprising a generator, means for driving said generator from said supercharger, and a motor energized from said generator for controlling said contact controlling member at speeds of said supercharger above said predetermined speed.

9. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation, electrical means for taking control of said supercharger away from said last mentioned means outside said range of operation to maintain the speed of said supercharger below a predetermined value comprising an alternating current generator driven by said supercharger, a torque motor energized from said generator, means for preventing effective energization of said torque motor when the speed of said supercharger is below said predetermined value, and means for modifying the operation of said last mentioned means to permit the speed of said supercharger to exceed said predetermined value.

10. In combination, a turbosupercharger, valve means for regulating the flow of exhaust gases from the engine to the turbine, means responsive to a predetermined pressure appurtenant to an operating condition of said supercharger for positioning said valve means to maintain said predetermined pressure at a substantially constant value over a predetermined range of operation, electrical means for taking control of said supercharger away from said last mentioned means outside said range of operation to maintain the speed of said supercharger below a predetermined value comprising an alternating current generator driven by said supercharger, a torque motor energized from said generator, means including a serially arranged inductance and capacitance substantially resonant at a frequency corresponding to the maximum desired speed of said supercharger for preventing effective energization of said torque motor when the speed of said supercharger is below said predetermined value, and means for modifying the relative effective values of said serially arranged inductance and capacitance to permit the speed of said supercharger to exceed said predetermined value.

11. In combination, a turbosupercharger, valve means for regulating the flow of exhaust gases to the turbine, means responsive to a predetermined pressure appurtenant to an operating condition of said supercharger for positioning said valve means to maintain said predetermined pressure at a substantially constant value over a predetermined range of operation, electrical means for taking control of said supercharger away from said last mentioned means outside said range of operation to maintain the speed of said supercharger below a predetermined value comprising an alternating current generator driven by said supercharger, a torque motor energized from said generator, means including a circuit between said generator and said torque motor comprising a serially arranged inductance and capacitance designed to provide a substantially resonant circuit at a frequency corresponding to the maximum speed of said supercharger for preventing effective energization of said torque motor when the speed of said supercharger is below said predetermined value, and means for modifying the effective magnitude of said inductance to permit the speed of said supercharger to exceed said predetermined value for short periods of time under abnormal operating conditions of said internal combustion engine.

12. In combination, a turbosupercharger, a waste gate for regulating the flow of exhaust gases to the turbine, a motor for positioning said waste gate, means responsive to a predetermined pressure appurtenant to an operating condition of said supercharger for controlling said motor to position said waste gate and maintain said predetermined pressure at a substantially constant value over a predetermined range of operation, including a pivotally mounted contact controlling member and a flexible bellows responsive to said predetermined pressure connected to said contact controlling member, a waste gate opening contact adapted to be engaged by said contact controlling member to energize said motor to open said waste gate upon an increase in pressure above said predetermined pressure, a waste gate closing contact adapted to be engaged by said contact controlling member to energize said motor to close said waste gate upon a decrease in pressure below said predetermined pressure, means for taking control of said supercharger away from said first mentioned means outside said range of operation to prevent said supercharger from exceeding a predetermined speed comprising a generator, means for driving said generator from said supercharger, a motor energized from said generator, and a cam driven by said motor for engaging said contact controlling member at speeds of said supercharger above said predetermined speed.

13. In combination, a turbosupercharger, a waste gate for regulating the flow of exhaust gases to the turbine, a motor for positioning said waste gate, means responsive to a predetermined pressure appurtenant to an operating condition of said supercharger for controlling said motor to position said waste gate and maintain said predetermined pressure at a substantially constant value over a predetermined range of operation, including a pivotally mounted contact controlling member and a flexible bellows responsive to said predetermined pressure connected to said contact controlling member, a waste gate opening contact adapted to be engaged by said contact controlling member to energize said motor to open said waste gate upon an increase in pressure above said predetermined pressure, a waste gate closing contact adapted to be engaged by said contact controlling member to energize said motor to close said waste gate upon a decrease in pressure below said predetermined pressure, means for taking control of said supercharger away from said first mentioned means outside said range of operation to prevent said supercharger from exceeding a predetermined speed comprising a generator, means for driving said generator from said supercharger, a motor energized from said generator for controlling said contact controlling member at speeds of said supercharger above said predetermined speed, and stabilizing means for moving said waste gate closing and opening contacts in response to the position of said waste gate.

14. In combination, a turbosupercharger, a waste gate for regulating the flow of exhaust gases to the turbine, a motor for positioning said waste gate, means responsive to a predetermined pressure appurtenant to an operating condition of said supercharger for controlling said motor to position said waste gate and maintain said predetermined pressure at a substantially constant value over a predetermined range of operation, including a pivotally mounted contact controlling member and a flexible bellows responsive to said predetermined pressure connected to said contact controlling member, a waste gate opening contact adapted to be engaged by said contact controlling member to energize said motor to open said waste gate upon an increase in pressure above said predetermined pressure, a waste gate closing contact adapted to be engaged by said contact cotnrolling member to energize said motor to close said waste gate upon a decrease in pressure below said predetermined pressure, means for taking control of said supercharger away from said first mentioned means outside said range of operation to prevent said supercharger from exceeding a predetermined speed comprising a generator, means for driving said generator from said supercharger, a motor effectively energized from said generator substantially only when said predetermined speed has been attained, and a cam connected to said motor for engaging said contact controlling member to control the same at speeds of said supercharger above said predetermined speed.

ROBERT J. HOFFMAN.
FREDERICK E. CREVER.